United States Patent [19]

Galiani

[11] Patent Number: 5,610,770

[45] Date of Patent: Mar. 11, 1997

[54] MAGNIFYING CONTAINER FOR PRINTED MATTER

[76] Inventor: Alfred J. Galiani, 1207 Ina La., McLean, Va. 22102

[21] Appl. No.: 561,314

[22] Filed: Nov. 21, 1995

Related U.S. Application Data

[62] Division of Ser. No. 124,452, Sep. 22, 1993, Pat. No. 5,471,347.

[51] Int. Cl.$^6$ .................................................. G02B 27/02
[52] U.S. Cl. ........................... 359/807; 359/802; 359/804; 359/809; 781/7; 781/42; 781/45; 781/38; 206/37; 40/365
[58] Field of Search ..................................... 359/441, 802, 359/804, 807, 808, 809, 810, 811, 812, 817; 281/45, 42, 7, 14, 31, 38; 206/37, 232; 40/365

[56] References Cited

U.S. PATENT DOCUMENTS

| | | |
|---|---|---|
| 480,649 | 8/1892 | Bailey et al. . |
| 547,114 | 10/1895 | Graham . |
| 1,170,793 | 2/1916 | Ballantine . |
| 1,194,742 | 8/1916 | Johnson . |
| 1,957,716 | 5/1934 | Koster . |
| 2,510,053 | 6/1950 | Pfeiffer . |
| 3,140,579 | 7/1964 | Skakel, Jr. . |
| 3,140,883 | 7/1964 | Anthony . |
| 3,774,993 | 11/1973 | Senff . |
| 3,797,917 | 3/1974 | Barbour . |
| 4,405,157 | 9/1983 | Bennett . |
| 4,416,470 | 11/1983 | Beck et al. .................................. 281/7 |
| 4,452,399 | 6/1984 | Schoenleber et al. . |
| 4,468,874 | 9/1984 | Chiodo .................................... 40/365 |
| 4,552,382 | 11/1985 | Cowden ................................... 281/45 |
| 4,573,821 | 3/1986 | Gilreath .................................. 281/38 |
| 4,795,194 | 1/1989 | Etheredge . |
| 4,805,680 | 2/1989 | Ueno ...................................... 359/809 |
| 4,819,351 | 4/1989 | Boitani . |
| 4,861,073 | 8/1989 | Poretsky ................................. 281/45 |
| 4,863,026 | 9/1989 | Perkowski .............................. 359/809 |
| 5,048,928 | 9/1991 | Davis . |
| 5,333,907 | 8/1994 | Schaffer ................................. 281/42 |

FOREIGN PATENT DOCUMENTS 3044816  7/1982  Germany .

*Primary Examiner*—Loha Ben
*Attorney, Agent, or Firm*—Greenblum & Bernstein, P.L.C.

[57] ABSTRACT

A lens magnification system is provided for booklets, such as restaurant menus, to enable persons having impaired vision or persons in an environment of poor light to magnify the print or other images of the booklet to the extent that it becomes easily readable. In one form of the invention a flat sheet type lens, such as a Fresnel lens, is supported for linear movement and for pivotal movement by a pivot frame structure to enable movement of the lens from a stored position between the pages of the booklet to a position for use and to be selectively positioned at a desired distance from and in parallel relation to a page of the booklet for magnification of the print or other images thereon. The magnification system may be releasably attachable to conventional booklets or in the alternative may be disposed in fixed assembly with the structure of the booklet. In another embodiment of the invention the lens is physically connected to the structure of the booklet by one or more accordion connectors that permit the lens to be manually moved from a position of storage to a position of use that is selected by the user. As a further alternative a folding container may be provided having pockets for receiving maps and other printed matter. A lens defining a wall of the folder is spaced from a pocket wall sufficiently to magnify the printing on items located within the pockets.

14 Claims, 6 Drawing Sheets

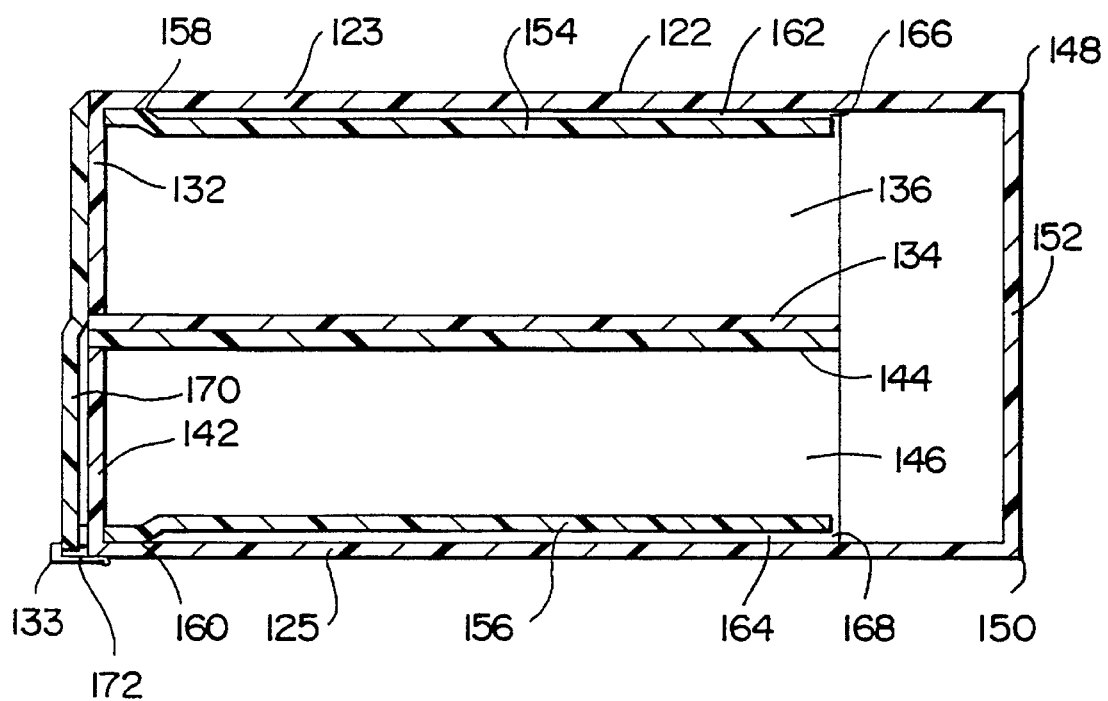

MAGNIFYING CONTAINER FOR PRINTED MATTER

"This application is a division of application Ser. No. 08/124,452, filed Sep. 22, 1993, now U.S. Pat. No. 5,471,347."

FIELD OF THE INVENTION

The present invention relates to a flexible or rigid folder for containing and protecting printed matter and incorporating a magnifying lens, such as a Fresnel lens or any other suitable lens for magnifying certain printed matter contained therein. More particularly, this invention relates to positioning a lens such as a flat sheet magnifying lens in spaced relation with printed and other graphical subject matter, such as booklets, maps, map booklets and restaurant menus for example, for the purpose of magnifying the print so that it is capable of being read by persons having vision impairment or capable of being read in conditions of poor light.

BACKGROUND OF THE INVENTION

From the historical perspective, eating establishments which prepare food and drink and serve it to customers have been available for centuries. The word "restaurant", however, was not utilized until after about 1750. At first the word "restaurant" referred only to the eating section of a hotel or to a coffee house patronized by the rich. By the 1900's, however, the word "restaurant" was utilized for several different types of eating establishments. Today, the word "restaurant" is utilized for almost any facility that serves food. Restaurants range from the small hamburger stand to the most expensive night club or eating establishment. Almost all of these eating establishments have at least one thing in common, a list or menu of food and drinks that is offered for sale to customers. These lists or menus of food and drink are sometimes displayed in large bold print and are relatively easy to read by all patrons. However, these types of menus are normally found in eating establishments known as "fast-food" or "carry-out" eating places and also cafeterias. In other eating establishments, patrons are typically greeted by a host or hostess and are seated at a table or booth. These patrons are typically provided with a menu, being a list of foods that are offered by the eating establishment. The list, bill of fare, or more commonly known as a menu, might be a simple one page list or a multiple page listing. The printed matter on these menus vary in size from one menu to another and from one restaurant to another. Normally, the lighting in these establishments is sufficient so that those with normal vision are able to read the printed word without causing exceptional eye strain. However, in many restaurants the lighting is dimmed or candle light is used to impart a desirable atmosphere for the enjoyment of the patrons. This presents a problem even for many patrons having normal vision. More particularly, those patrons who use eyeglasses or other aids for reading, are drastically affected if the light in the restaurant environment is quite dim. It is desirable, therefore, to provide menus typically in the form of folders or booklets for use by restaurant patrons where the menus incorporate the capability by the patrons to magnify the print on the menu page so that it becomes more readable to all patrons, including those patrons having relatively poor vision. The term "booklet" as used herein is intended to encompass a wide variety of printed items such as restaurant menus as discussed above, folded maps, map books or booklets, recipes, receipts, catalogs, letters, photographs, etc.

Although restaurant patrons can be provided with a magnifying device, such as a conventional lens, a Fresnel lens or other flat sheet type lens for the purpose of magnifying the print of the menus, it becomes relatively easy for the lens to become separated from the menu so that it is not readily available for use by the customer. In some cases, magnifying lenses which are provided for use by customers become lost or are taken by customers because of their desirability for other purposes. Consequently, it is desirable to provide a restaurant menu or booklet magnification system wherein a lens, particularly a flat sheet type lens, is physically attached to the structure of the menu or booklet itself, yet can be moved to an appropriate position by the patron or other user for accomplishing desired magnification of the print. For maximum magnification of print by flat, sheet type lenses, such as Fresnel lenses, it is considered desirable to position the substantially flat sheet lens at a distance of approximately four inches from the printed page to be read and to be positioned in substantially horizontal relation with the printed page. A facility for attaching the flat sheet lens to the menu and yet providing the patron with the capability of positioning the lens at a distance of about four inches from the printed page has heretofore been unavailable. It is desirable, therefore, to provide a menu or other booklet construction which will permit permanent attachment of a flat sheet lens to the menu structure and yet allow the patrons to make effective use of it for magnification of the print.

Although the present invention is described herein principally in connection with the use of Fresnel lenses for magnification of printed matter, this invention is not intended to be limited in any manner whatever by the recitation of any particular lens structure. The scope of this invention, therefore, is intended to include any suitable lens mechanism that is considered suitable for the intended purpose.

In many cases, restaurants with extensive menus offer a sufficient variety of food for service to patrons that a multiple page menu is virtually necessary. In such case, attachment of a flat sheet type lens, such as a Fresnel lens, so as to position it between certain pages will typically be ineffective for enabling the patron to use the lens for magnification of any of the pages of the menu. Thus, it is desirable to provide a lens magnification system for pamphlets or booklets such as restaurant menus which enable a lens, such as a flat sheet lens, to be permanently attached to the menu structure and yet permit the customer to turn the pages of the booklet or menu and thus enable the customer to adequately utilize the lens for magnifying the print on all pages thereof.

SUMMARY OF THE INVENTION

It is a principal feature of the present invention to provide a novel magnification system for use with booklets to thereby enable the user to accomplish simple and efficient positioning of the lens in the manner that appropriately magnifies the print on any of the selected pages of the booklet.

It is another feature of this invention to provide a novel magnification system for booklets which is structurally interconnected with the booklet to prevent separation therefrom and which is controllably positionable to enable the user to turn the pages of the booklet in relation to the lens to thereby enable the user to select any page for magnification and to use the lens for significant enlargement of the print by magnification to enable persons with poor eyesight to have the capability of reading even under conditions of relatively poor light.

It is also a feature of this invention to provide a novel booklet page magnification system of the flat sheet or Fresnel type which enables the lens, when not in use, to be easily positioned between the pages of a booklet, such as a restaurant menu, so that it will ordinarily not be susceptible to damage, deterioration or soiling when subjected to normal use such as in a restaurant environment.

Briefly, the various objects and features of the present invention are realized through the provision of a lens magnification system which is supported in assembly with a booklet, such as a restaurant menu or the like, and which is movable relative to the pages of the booklet so as to enable a user to position the lens at a significant distance from the page and parallel to the page so as to enable the user to significantly magnify the print thereon and to render it easily readable even under circumstances of poor light.

One suitable embodiment of the invention may conveniently take the form of a generally U-shaped frame, having a base portion that is pivotally connected to the menu or other booklet at the crease between pages. Typically, this pivotal base section of the frame will be of slightly greater length as compared to the height of the pages of the booklet. From the pivotal base section of the frame extend a pair of generally parallel support arms that are disposed in substantially parallel relation with one another. A pair of lens support elements are each selectively slidable along the length of the support arms to thereby enable the lens to be positioned at any location along the length of the support arms. The lens support elements are in the form of pivot members which enable the lens to be mounted in pivotal relation therewith so that the lens may be positioned in transverse relation with the respective support arms. Additionally, the support arms are provided with stops at each extremity to thereby enable the pivot mount elements to slide completely to the ends of the support arms without becoming inadvertently separated therefrom.

As an alternative embodiment a flat sheet lens, such as a Fresnel lens, may be supported in assembly with a booklet, such as a restaurant menu, by means of one or more accordion-like supports which enable the lens to be selectively retained at the crease between adjacent pages or to be moved outwardly to a position for extensive magnification of the printed matter on the pages.

In an alternative embodiment of this invention a folder structure may be provided which basically serves as a protective cover for various booklet like structures including restaurant menus, advertising booklets, maps, travel booklets, credit card receipts, recipes, etc. This protective cover is provided with pockets on each side thereof with one surface of the pockets being defined by a magnifier lens which will typically be in the form of a sheet type lens such as a Fresnel lens. The configuration of the pockets is such that the objects within the pockets are positioned in appropriately spaced relation with the magnifier lens and thus the printing on the objects is magnified. This feature enables the user to read even the smallest of print such as is typically present on travel maps and the like.

Either of the lens magnification systems set forth above may be easily and simply attached to a conventional booklet to thus enable proprietors to add them to conventional booklets that are already printed, or to change them in the event the booklets are reprinted and replaced. The present invention also permits effective use of other lens magnification systems that represent further embodiments of the present invention.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

Figure 1:
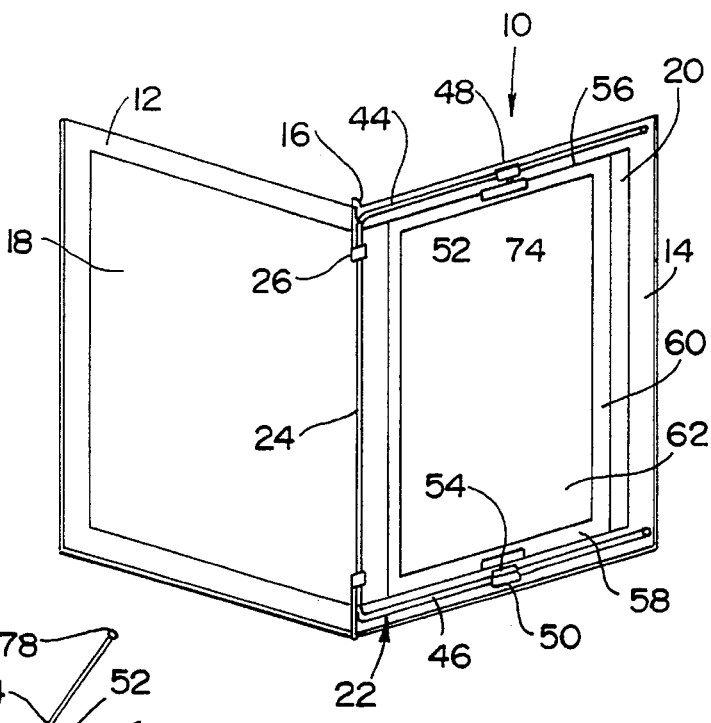

FIG. 1 is an isometric illustration of a booklet such as a restaurant menu, having a flat sheet lens type magnification system suitably connected in assembly therewith.

Figure 2:
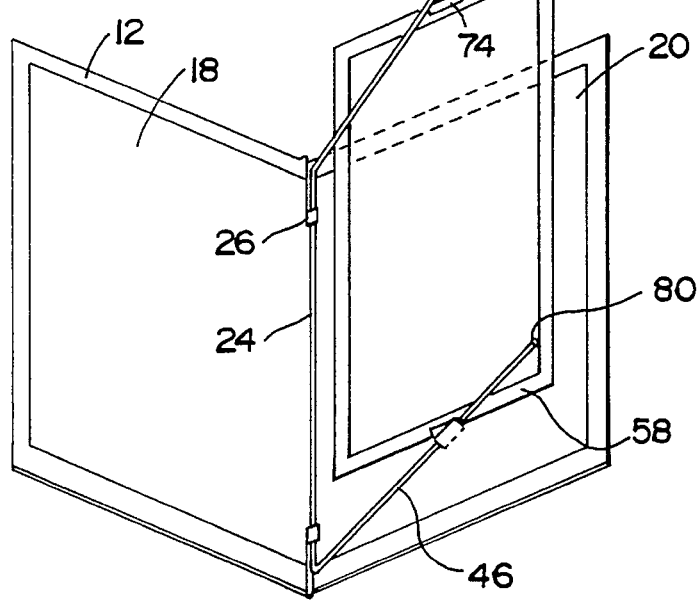

FIG. 2 is an isometric illustration similar to that of FIG. 1, but showing the lens magnification system being positioned at a magnifying position.

Figure 3:
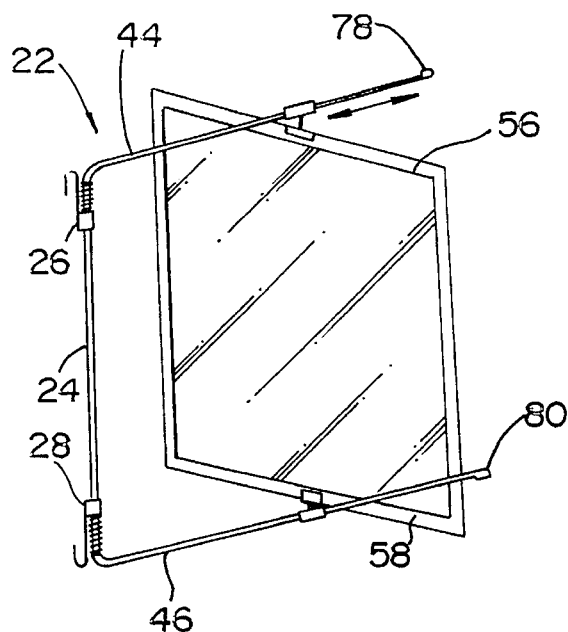

FIG. 3 is a further isometric illustration showing the lens magnification system of the present invention and illustrating the lens being positioned in transverse relation to the opposed support arms thereof.

Figure 4:
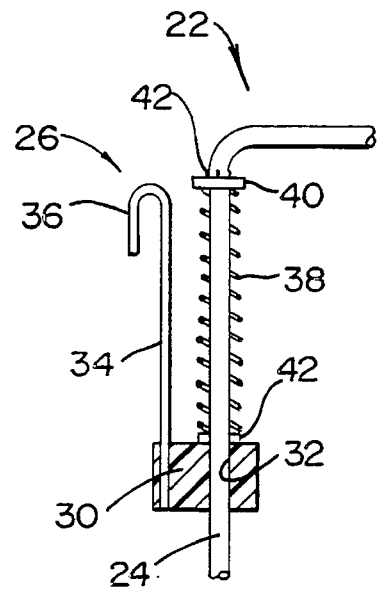

FIG. 4 is a fragmentary elevational view of a portion of the pivot frame structure of the booklet magnification system of FIGS. 1–3, having a part thereof shown in section and depicting one of the pivot connectors of the pivot frame structure.

Figure 5:
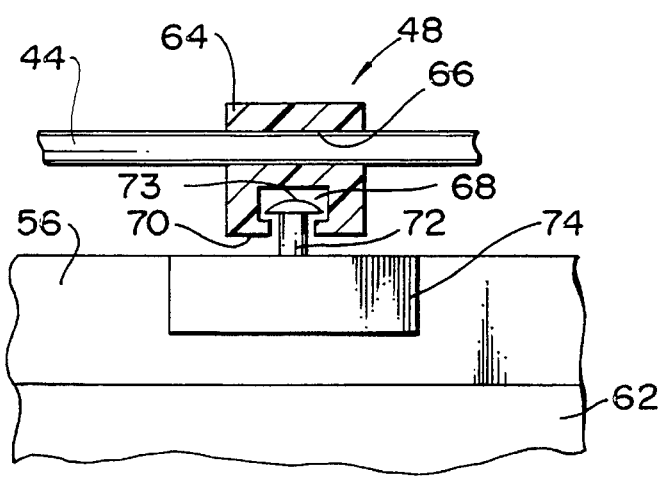

FIG. 5 is a fragmentary elevational view of the upper lens pivot mount assembly of the pivot frame and lens structures, with a part thereof illustrated in section.

Figure 6:
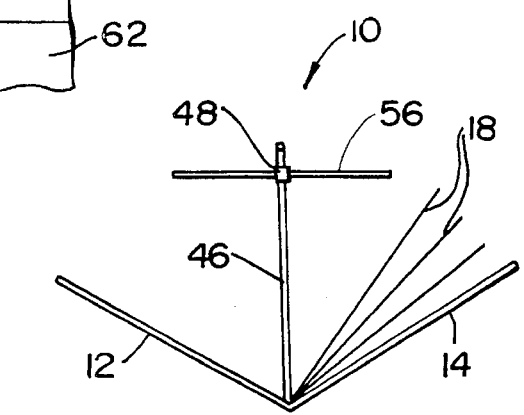

FIG. 6 is an end view of a booklet having a flat sheet type magnification system connected therewith in accordance with the present invention and showing its relation to multiple pages of the booklet to thus enable the pages to be turned while the device is in assembly with the booklet.

Figure 7:
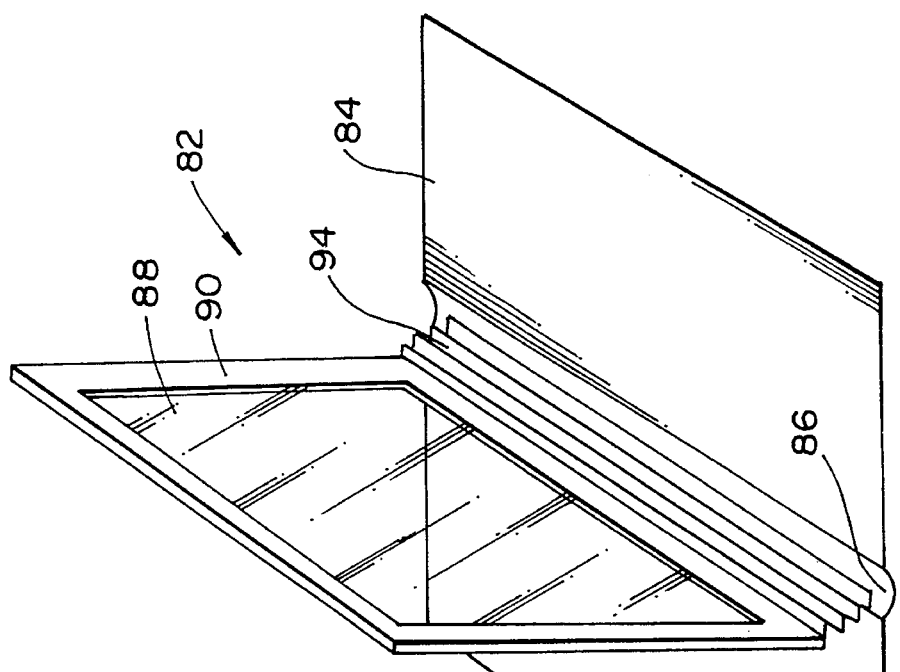

FIG. 7 is an isometric illustration of a modified embodiment of the present invention wherein interconnection between the flat sheet lens and the booklet is established by means of an accordion-like support.

Figure 8:
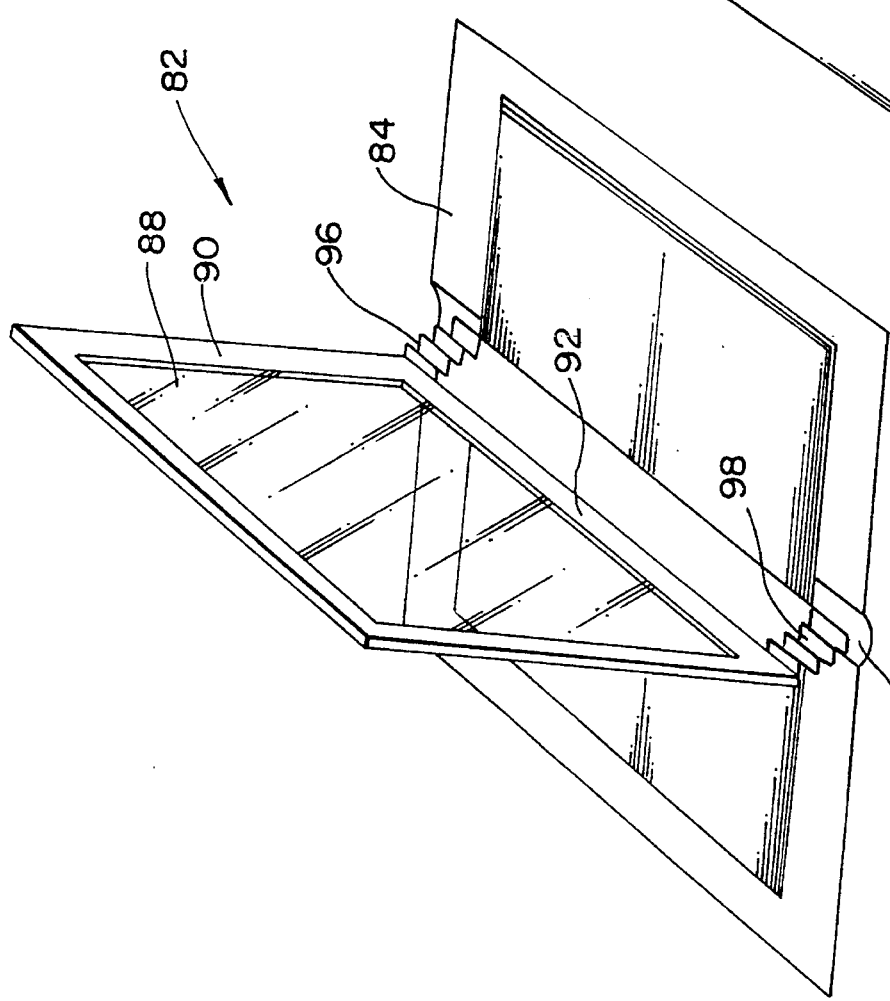

FIG. 8 is an isometric illustration of another embodiment of this invention.

Figure 9:
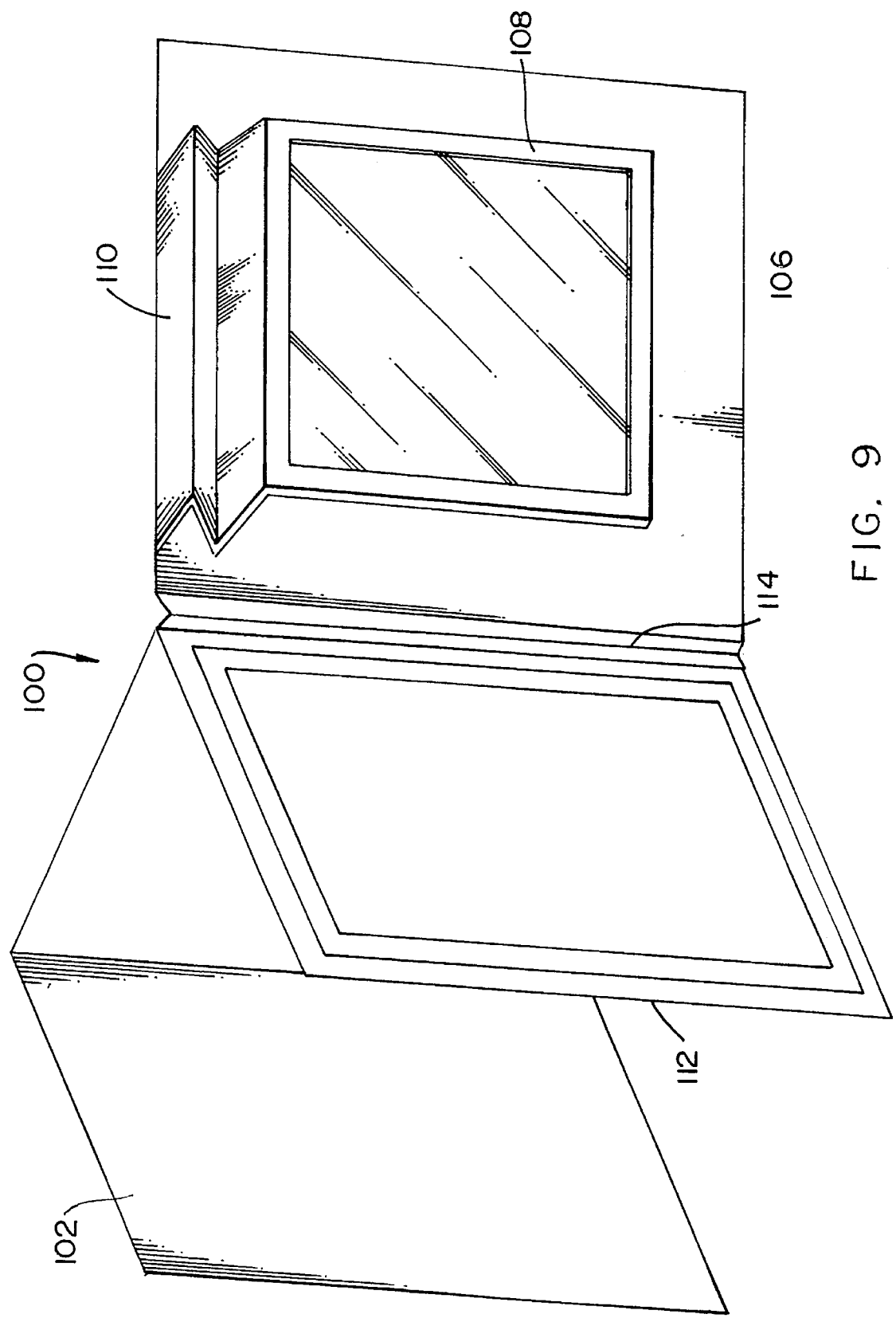

FIG. 9 is an isometric illustration of an even further embodiment of the present invention.

Figure 10:
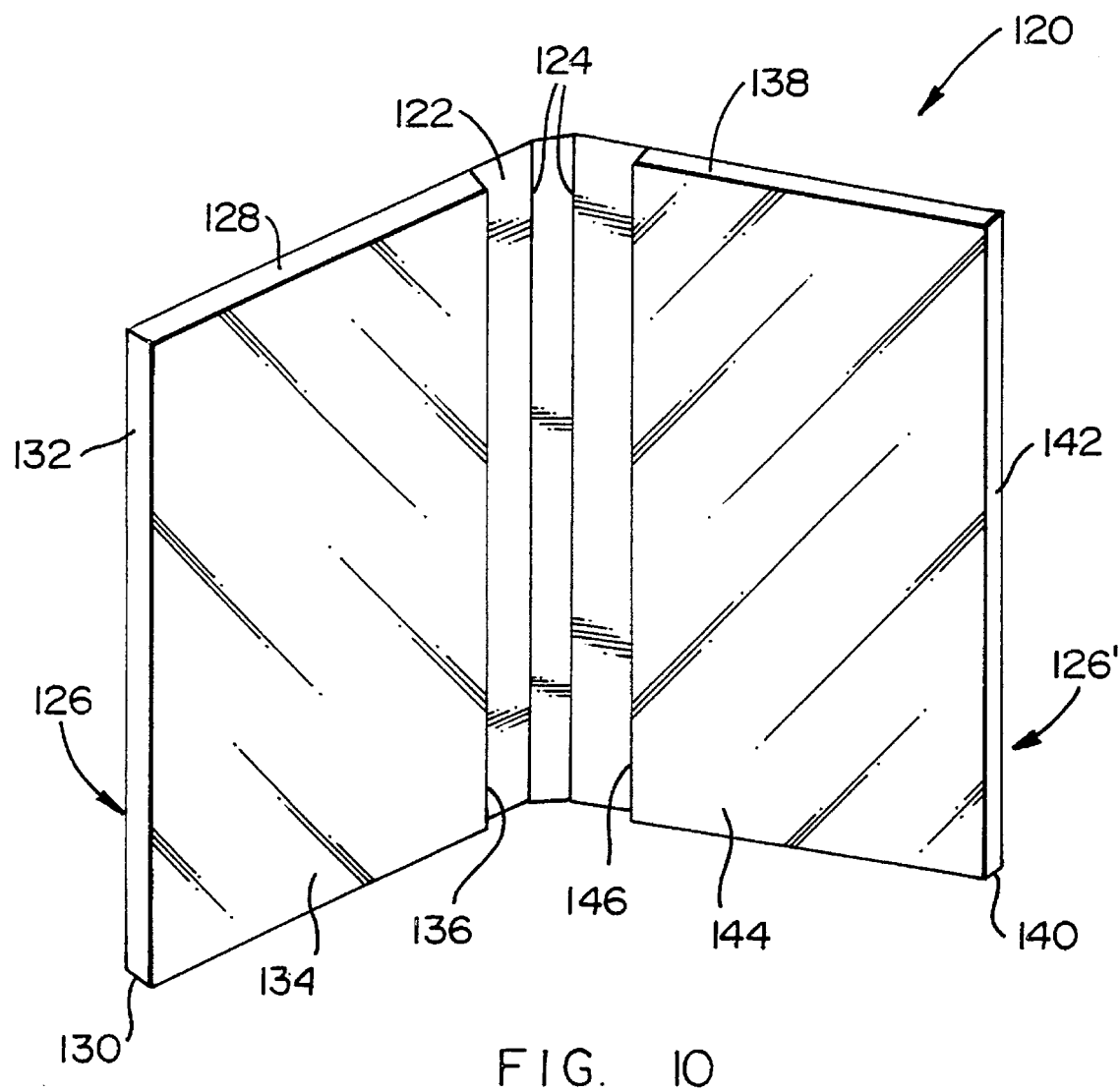

FIG. 10 is an isometric illustration of a folding protective cover constructed in accordance with this invention and having pockets on each side thereof with one surface or wall of the pockets being defined by sheet type magnifier lenses.

FIG. 11 is a partial sectional view of a magnifying folder similar to that of FIG. 10 and illustrating the folded condition thereof.

DETAILED DESCRIPTION OF PREFERRED EMBODIMENT

Referring now to the drawings and first to FIG. 1, a booklet assembly having a magnification system is illustrated generally at 10 and comprises cover sheets 12 and 14 that are interconnected along a fold line 16. Typically, the cover sheets 12 and 14 will be formed of an integral sheet of durable cover stock of any suitable character which is folded along fold line 16 to define the cover structure for the booklet. The cover stock is preferably transparent or translucent and may be composed of any of a number of suitable polymer materials or heavy paper materials including relatively rigid or flexible varieties. The booklet also typically includes two or more printed pages 18 and 20 which are interconnected to the cover structure at the fold line 16 such as by stapling or by any other suitable means of attachment. Although only two internal pages 18 and 20 are shown in assembly with the cover structure to comprise the booklet, the booklet may include any suitable number of internal pages to suit the needs of the user. It should be born in mind that although the booklet print magnification system of the present invention is discussed herein particularly as it relates to restaurant menus that this magnification system may be employed in conjunction with other types of booklets, including books, to enable persons having impaired vision to greatly magnify the print of the book or booklet to enable reading of the printed or pictorial material that is printed in the booklet. It should also be born in mind that with respect to restaurant menus, it is typical for the inside page of the cover sheets to be printed with the menu of the restaurant establishment. Thus, it is desirable from the standpoint of the present invention, that the magnification system also provide the user with the capability of magnifying the print on the inside cover sheets as well as the internal pages.

As is shown in assembly with the booklet or menu of FIGS. 1 and 2, and as shown disassembled from the booklet in FIG. 3, there is provided a pivot frame structure shown generally at 22 which includes an elongate, substantially straight base section 24 which is provided with a pair of pivot connector elements 26 and 28, one of which is shown in greater detail in FIG. 4. As is evident from the fragmentary elevational view of FIG. 4 the pivot connector element shown generally At 26 includes a pivot body 30 having an internal passage 32 which establishes pivotal relation with the base section 24 of the pivot frame shown generally at 22. From the pivot base 30 projects an elongate retainer element 34 having a reversed bent hook-like portion 36 at the free extremity thereof which is adapted to hook over one of the upper or lower edges of the booklet 10 in the manner shown in FIGS. 1 and 2.

The connector element 26 is urged in one direction, downwardly, as shown in FIG. 4, by means of a coil-type compression spring 38 which is received about the base section 24 of the pivot frame. The upper end of the compression spring bears against a compression spring stop 40 in the form of a small washer which is restrained against upward movement as shown in FIG. 4 as by means of a stop structure 42 which is defined by a structural deformation of the stock from which the pivot frame is formed. In essence the pivot frame can be formed from an elongate metal wire stock which may be chrome plated, or plated in any other manner for purposes of aesthetically pleasing appearance. The structural deformation 22 may be defined simply by deforming the metal strip with a pin-type punch.

The upper end of the compression spring 38 bears against the stop washer 40 while the lower end of the compression spring bears against the pivot base 30 or against a washer 42 that might be interposed between the spring and the pivot base. The elongate connector element 34 may be connected to the pivot base 30 such as by molding it in place, bonding it to the pivot base or attaching it to the pivot base by means of screws, etc.

In order to apply the pivot frame 22 to the booklet structure, the pivot connector elements 26 and 28 are manually moved away from one another, thus compressing the springs 38 of each of the pivot connectors. The connectors are manually spread sufficiently to clear the reverse bent hook sections beyond opposed edges of the booklet. When manual force is released the compression springs 38 move the spring urged pivot connectors toward one another, thus causing the reversed bent hook portions 36 to become secured about the upper and lower edges of the booklet in the region of the fold. This places the base section 24 of the pivot frame 22 at the fold of the booklet.

The frame structure 22 also includes a pair of generally parallel support arms 44 and 46 which are preferably formed integrally with the base section 24 or which may be connected to the base section in any other suitable manner. Typically, the base section 24 and the support arms 44 and 46 will all be formed from a single strip of relatively heavy wire stock. The pivot connectors 26 and 28 will be assembled to the wire stock before it is bent to the U-shaped form that is shown in the drawings.

A pair of magnifier pivot mounts 48 and 50 are received in sliding relation with the elongate support arms 44 and 46 respectively and include pivot elements 52 and 54 which are disposed in pivotal relation with the respective pivot mounts and which are disposed in fixed relation with upper and lower edges 56 and 58 respectively of a lens mounting frame 60 having a flat sheet lens, such as a Fresnel lens 62 secured therein.

As shown in FIG. 5, each of the pivot mounts 48 and 50 may include a support slide body 64 having an internal passage 66 which receives the support arm 44 or 46 in sliding relation therewith. The support slide body 64 may be composed of a polymer material which defines the internal passage 66 and also defines an internal pivot cavity 68 having its outer portion restricted by flexible retainer lips or shoulders 70. The pivot portion of the structure may define a pivot member 72 having an enlarged head portion 73 which is capable of being forced into the cavity 68 by forcible deformation of the retainer shoulders 70. After this character of assembly has been established the pivot element 72 will be interconnected in pivotal relation with the support slide body 64. The pivot member 72 may also include a lens connector structure 74 which may be suitably connected in immovable relation to the upper or lower edge portion 56 or 58 of the lens mounting frame 60. The lens connector portion 74, if desired, may be of bifurcated construction so as to engage both sides of the lens frame and may be connected to the lens frame by means of bonding material or by mechanical connectors such as brads or staples. The pivot mount structure shown in FIG. 5 enables the Fresnel lens to be selectively moved either toward the base section 24 of the frame or away from it so as to enable the user to position the lens in desirably spaced relation with the page to be magnified. Likewise, the pivot mount assembly enables the lens to be pivoted to an angulated relation with the pivot frame such as that shown in FIGS. 2 and 3, thus enabling the lens to be positioned in parallel relation with the page as well as in suitably spaced relation from the print or other image to be magnified. When the lens is not intended to be used, it can be moved by means of the pivot mounts to a parallel relation with the support arms 44 and 46 and can be positioned with one of its edges in juxtaposition with the pivot section 24 of the frame. In this position, the lens, together with its frame support assembly will lie flat between pages of the booklet or menu.

As mentioned above, it is desirable to provide a page magnification system for booklets such as restaurant menus which will enable its use for selective magnification for any one of a number of pages of a multi-page booklet and to permit magnification of the inner surfaces of the cover sheets as well. The booklet magnification system of this invention effectively accomplishes these features in the manner shown in FIG. 6. The opposed pivot mounts 48 and 50 may be moved to the extremities of the support arms 44 and 46 as shown in FIG. 6 and may be pivoted to a transverse relation with support arms as shown so as to enable the various pages of the booklet to be turned beneath the lens. After appropriate pages have been selected. The lens is then moved along the length of the support by movement of its pivot mount assemblies, thus enabling it to be placed in appropriately spaced, parallel relation with the page to be magnified. This feature enables the lens to be positioned for magnification of the inside surface cover sheets of the booklet as well as any of the multiple pages thereof.

To prevent the pivot mount assemblies 48 and 50 from becoming inadvertently separated from the support arms 44 and 46 during positioning as shown in FIG. 6, the respective ends of the pivot arms are provided with stop elements 78 and 80 which may take any convenient form. The stop elements may be removably connected to the support arms if desired, or, in the alternative, the respective free extremities of the support arms may simply be bent in such manner so as to positively retain the pivot mounts in assembly therewith.

Referring now to FIG. 7, an alternative embodiment of the invention is illustrated generally at 82 wherein a booklet or menu 84 having a folding portion 86 is provided with a flat sheet or Fresnel type magnifying lens 88 in accordance with the teachings of this invention. The lens 88 is provided with a generally rectangular frame structure 90 having a frame section 92 having an accordion folded connector 94 connected thereto. The connector 94 is also secured to the booklet 84 at or near its folding portion 86 so as to enable the lens to be pivotally oriented to magnify the pictorial or printed matter on either of the booklet pages. The accordion like folded connector 94 enables the lens to be moved to a substantially spaced relation with the particular page to be magnified and yet permits it to be positioned in substantially parallel position with the page so that the printed matter on the page is subjected to substantially even magnification and so that it is not subjected to any significant degree of distortion.

As shown in FIG. 8, for multiple page booklets, to permit turning of the pages, the accordion-like connection between the booklet and the frame structure 92 of the lens 88 there will be provided a pair of spaced accordion-like connectors 96 and 98 which are each connected to the lens frame structure and to the booklet in the manner shown in FIG. 7 and which are spaced slightly greater that the height of the pages. Thus with the lens moved outwardly to the full extend of the accordion-type connectors the pages of the booklet may be turned beneath the lens. This feature will enable the lens to be utilized for magnification of the print or pictorial images on the pages of the booklet and on the inside sheets of the cover.

Referring now to FIG. 9, another embodiment of the present invention is illustrated wherein a booklet is shown in the form of a fold-out, restaurant menu type booklet shown generally at 100 having integrally connected booklet sheets 102, 104 and 106. A lens-type magnifier 108 may be connected to one of the sheets 106 by means of an accordion-type connector 110 thus permitting the magnifier lens to be positioned in suitably spaced parallel relation with the page to be magnified. If desired, another lens 112 may be connected along one side thereof to a fold of the booklet as shown at 114, thus enabling all of the pages of the menu to be magnified if desired.

Referring now to FIG. 10, a booklet protecting magnifying folder constructed in accordance with this invention is illustrated generally at 120 and is generally defined by a generally rectangular cover sheet of material 122 which is folded at its intermediate portion along parallel lines 124. The sheet material 122 may be composed of any suitable polymer material, paper, polymer impregnated paper or a combination of materials as suits the needs of the user. The sheet material 122 of the magnifying folder is preferably transparent to enable objects enclosed therein to be readily seen through the back side of the cover.

On each side of the fold lines 124 magnifying pockets are provided as shown generally at 126 and 126'. Pocket 126 is defined by upper and lower side walls 128 and 130 and an end wall 132 which are each connected to and disposed in normal relation with respective side and end edges of the cover sheet 122 so that the cover sheet forms one wall of the pocket. The inner wall 134 of the pocket is defined by a sheet type magnifier lens which is attached at respective edges thereof to the walls 128, 130 and 132. The pocket structure defines an opening 136 which is located adjacent the fold line 124 and through which objects may be inserted into the pocket.

At the opposite side of the folder upper and lower walls 138 and 140 and an end wall 142 of pocket 126' are fixed to or extend from the cover sheet material 122 and are disposed in substantially normal relation with or extend in transverse relation to the cover sheet. A magnifier sheet lens or panel 144 is connected at three of its edges to the walls 138, 140 and 142 thus orienting the magnifier sheet 144 in spaced, generally parallel relation with the respective side panels 123 and 125 of the cover sheet 122. Here again the magnifier lens 144 may conveniently take the form of a Fresnel lens or any other suitable type of lens. The lens 144 cooperates with the side walls 138, 140 and 142 to define a pocket and forming an opening 146 through which objects may be inserted into the pocket. Each of the pocket openings face the fold lines 124 thus permitting panels or sections of folded printed matter to be inserted into each of the pockets.

As shown in the partial sectional view of FIG. 11, the cover sheet 122 may have double fold defining corners 148 and 150 and defining an intermediate sheet panel 152 which, in the folded condition of the folder, is positionable in normal relation with opposed portions of the cover sheet as shown. The retainer sheets may be composed of flexible sheet material such as a translucent or transparent polymer. Additional retainer sheets 154 and 156 may be located within the respective pockets with peripheral edges thereof fixed to the respective cover sheets as shown at 158 and 160. These retainer walls cooperate with the cover sheet 122 at each pocket to define secondary pockets or cove pockets 162 and 164 which are adapted to receive objects such as maps, menu sheets, receipts, recipes, etc. The retainer walls 154 and 156 cooperate with the cover sheet or sheet panels to define respective openings 166 and 168 through which objects may be inserted into the secondary pockets 162 and 164. With objects positioned within the secondary pockets, the objects are positioned by the retainer walls 154 and 156 in spaced relation with the respective magnifier lenses 134 and 144. The double folded relationship defining fold corners 148 and 150 enable the folder to be closed in such a manner that the magnifier lenses are disposed in face to face protected relationship.

The magnifier folder may also be provided with a closure element such as shown at 170 to secure it in its folded condition as shown in FIG. 11. The closure element may be defined by a flexible strap which is fixed to one of the pocket structures and which has a free extremity adapted to be retained by a retainer snap, button, or hook and loop fastener assembly 172. The closure strap may be secured to the end wall 132 with a portion 133 thereof extending over the end wall 142. If a hook and loop fastener is employed as a retainer one of its hook and loop sections will be fixed to the closure strap and the other will be fixed to the wall section 142.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A magnification system for selective use to magnify printed matter comprising:

(a) a container adapted for containing and protecting a booklet having printed matter thereon;

(b) a lens;

(c) means for retaining said lens for movement with respect to said container and being positioned for magnification of said printed matter on said booklet; and means permitting manual positioning of said lens in selectively spaced, generally parallel relation with a selected page of said booklet for magnification of printed matter that is present on said selected page and permitting positioning of said lens between pages of said booklet for protective storage when said lens is not being used.

2. The magnification system of claim 1, wherein said means for retaining said lens and said means for permitting manual positioning of said lens comprise:

(a) a generally U-shaped pivot frame having a base section and a pair of elongate support arm elements extending in generally parallel spaced relation from said base section;

(b) a pair of pivot connectors being retained in assembly with said base section and having hook-like elements thereon for retaining engagement with upper and lower edge portions of said booklet and for pivotal support of said base section at the fold of said booklet; and (c) a pair of pivot mount elements each being supported for linear movement along the length of respective support arms, said pivot mount elements each having pivotal connection with said lens.

3. The magnification system of claim 2, wherein:

said generally U-shaped pivot frame is an integral element composed of elongate metal material having a circular cross-sectional configuration and defining said base section and said support arm elements.

4. The magnification system of claim 2, wherein: stop elements are provided at the respective free extremities of said support arm elements for retaining said pivot mount elements in assembly with said support arm elements.

5. The magnification system of claim 2, wherein said pivot connectors each comprise:

(a) a pivot base element being disposed in pivotal and linearly movable assembly with said base section of said pivot frame;

(b) means urging said pivot base elements toward one another; and (c) a retainer element extending from said pivot base element and defining said hook-like element at one end thereof.

6. The magnification system of claim 5, wherein: base section of said U- shaped frame in linearly and pivotal relation therein.

7. The magnification system of claim 2, wherein said pair of pivot mount elements each comprise:

(a) a support slide body being supported for linear movement by a respective one of said support arm elements; and (b) a pivot member being disposed in pivotal assembly with said support slide body and being connected in substantially immovable relation with said lens.

8. The magnification system of claim 2, wherein:

said pair of pivot mount elements each have linearly movable relation with respective support arm elements and each of said pivot mount element establishing pivotal support of said lens relative to the respective support arm elements whereby said lens is linearly movable relative to said base section to the extent determined by the length of said support arm elements and is pivotally supported on said support arm elements to thus enable said lens to be manually positioned in substantially parallel relation or in transverse relation to said support arm elements as desired and enabling said lens to be positioned between pages of said booklet for storage or to be extended along said support arm elements for use.

9. A magnification system for selective use to magnify printed matter comprising:

(a) a booklet having printed matter thereon;

(b) a lens mounted on a support for movement with respect to said booklet and being positioned for magnification of said printed matter on said booklet; and (c) means permitting manual positioning of said lens in selectively spaced, generally parallel relation with a selected page of said booklet for magnification of printed matter that is present on said selected page and permitting positioning of said lens between pages of said booklet.

10. The magnification system of claim 9, wherein said lens defines an area substantially the same as the area of said printed matter on said selected page.

11. The magnification system of claim 9, wherein said means for permitting manual positioning of said lens comprises a connector connected at one end to said booklet and at a second end to said lens.

12. The magnification system of claim 11, wherein said connector comprises an accordion-type folding connector.

13. The magnification system of claim 11, wherein said connector comprises two spaced accordion-type folding connectors, a space between said two spaced accordion-type connectors being greater than a height of a selected page, wherein pages of said booklet may be turned within said space.

14. The magnification system of claim 13, wherein said lens defines an area substantially the same as the area of said printed matter on said selected page.

* * * * *